(12) United States Patent
Mizutani et al.

(10) Patent No.: US 8,957,670 B2
(45) Date of Patent: Feb. 17, 2015

(54) STROKE AMOUNT DETECTION DEVICE

(71) Applicant: Denso Corporation, Kariya, Aichi-pref. (JP)

(72) Inventors: Akitoshi Mizutani, Okazaki (JP); Hitomi Honda, Kariya (JP); Yoshiyuki Kono, Obu (JP)

(73) Assignee: Denso Corporation, Kariya (JP)

( * ) Notice: Subject to any disclaimer, the term of this patent is extended or adjusted under 35 U.S.C. 154(b) by 133 days.

(21) Appl. No.: 13/856,830

(22) Filed: Apr. 4, 2013

(65) Prior Publication Data

US 2013/0271118 A1 Oct. 17, 2013

(30) Foreign Application Priority Data

Apr. 11, 2012 (JP) .................................. 2012-90481

(51) Int. Cl.
| | | |
|---|---|---|
| *G01B 7/00* | (2006.01) | |
| *G01R 33/025* | (2006.01) | |
| *G01D 5/00* | (2006.01) | |
| *G01D 5/14* | (2006.01) | |
| *G01B 7/14* | (2006.01) | |
| *G01B 7/30* | (2006.01) | |
| *G01R 33/06* | (2006.01) | |
| *H01L 43/06* | (2006.01) | |

(52) U.S. Cl.
CPC *G01B 7/003* (2013.01); *G01D 5/00* (2013.01); *G01D 5/145* (2013.01); *G01D 5/147* (2013.01); *G01B 7/30* (2013.01)
USPC ............... 324/207.12; 324/207.2; 324/207.24

(58) Field of Classification Search
CPC ............ G01B 7/003; G01B 7/30; G01D 5/00; G01D 5/147; G01D 5/145; F02D 41/009
USPC ......................................... 324/207.11–207.26
See application file for complete search history.

(56) References Cited

U.S. PATENT DOCUMENTS

| | | | |
|---|---|---|---|
| 6,211,668 B1 * | 4/2001 | Duesler et al. ............. | 324/207.2 |
| 6,496,002 B1 | 12/2002 | Kogiso et al. | |
| 7,893,688 B2 * | 2/2011 | Kawashima et al. .... | 324/207.24 |
| 2010/0188074 A1 * | 7/2010 | Matsumoto et al. ....... | 324/207.2 |
| 2011/0248705 A1 | 10/2011 | Matsumoto et al. | |
| 2011/0267040 A1 | 11/2011 | Frachon | |
| 2011/0301913 A1 | 12/2011 | Matsumoto et al. | |

FOREIGN PATENT DOCUMENTS

| | | |
|---|---|---|
| JP | 2000-321014 | 11/2000 |
| JP | 2009-204331 | 9/2009 |
| JP | 2011-220795 | 11/2011 |
| JP | 2012-503767 | 2/2012 |

* cited by examiner

*Primary Examiner* — Jermele M Hollington
*Assistant Examiner* — Raul Rios Russo
(74) *Attorney, Agent, or Firm* — Nixon & Vanderhye P.C.

(57) ABSTRACT

A stroke amount detection device includes a yoke, a magnetic flux generation section, and a magnetism detection section. The yoke has a protruding section that protrudes to outside the yoke. The magnetic flux generation section is located in the yoke. The magnetism detection section is disposed between the magnetic flux generation section and the protruding section. The magnetism detection section is disposed at a fixed position with respect to the magnetic flux generation section. The magnetism detection section outputs a signal in accordance with a magnetic flux density generated due to a relative movement of the yoke with respect to the magnetism detection section.

10 Claims, 13 Drawing Sheets

FIG. 20

STROKE AMOUNT DETECTION DEVICE

CROSS REFERENCE TO RELATED APPLICATIONS

The present application is based on and claims priority to Japanese Patent Application No. 2012-90481 filed on Apr. 11, 2012, the contents of which are incorporated in their entirety herein by reference.

TECHNICAL FIELD

The present disclosure relates to a stroke amount detection device.

BACKGROUND

Conventionally, a stroke amount detection device that detects a stroke amount of a detection object is known. For example, JP-A-2011-220795 (corresponding to US 2011/0248705 A1 and referred to as a patent document No. 1 hereafter) discloses a stroke amount detection device that includes a Hall element, a yoke, and permanent magnets attached to the yoke and detects a stroke amount of a detection object based on an output signal of the Hall element. Because the stroke amount detection device disclosed in the patent document No. 1 uses a repulsion of magnets, two permanent magnets facing each other across a virtual straight line on which the detection object moves are attached to the yoke.

In the stroke amount detection device disclosed in the patent document No. 1, because the two permanent magnets are provided, the number of components is large.

SUMMARY

It is an object of the present disclosure to provide a stroke amount detection device that can reduce the number of components.

A stroke amount detection device according to an aspect of the present disclosure includes a yoke, a magnetic flux generation section, and a magnetism detection section. The yoke is attached to one of a detection object and a holding part. The yoke is formed into a pipe shape from magnetic material. The yoke has a protruding section that protrudes to outside the yoke in a direction perpendicular to a virtual straight line. The protruding section has a top portion at which a distance from the virtual straight line in the direction perpendicular to the virtual straight line is maximum. The magnetic flux generation section is attached to the other one of the detection object and the holding part and is located in the yoke. The magnetism detection section is disposed between the magnetic flux generation section and the protruding section. The magnetism detection section is disposed at a fixed position with respect to the magnetic flux generation section. The magnetism detection section has a magnetism sensing direction in a direction perpendicular to a direction of a magnetic flux passing through the magnetic flux generation section. The magnetism detection section outputs a signal in accordance with a magnetic flux density generated due to a relative movement of the yoke with respect to the magnetism detection section.

The stroke amount detection device can detect a relative stroke amount of the holding part and the detection object only with one magnetic flux generation section. Thus, the number of components can be reduced.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

First Embodiment

A stroke amount detection device 1 according to a first embodiment of the present disclosure will be described below. The stroke amount detection device 1 is applied to a stroke part of, for example, a transmission, an accelerator, and a brake of a vehicle, and detects a stroke amount of a detection object.

Figure 1:
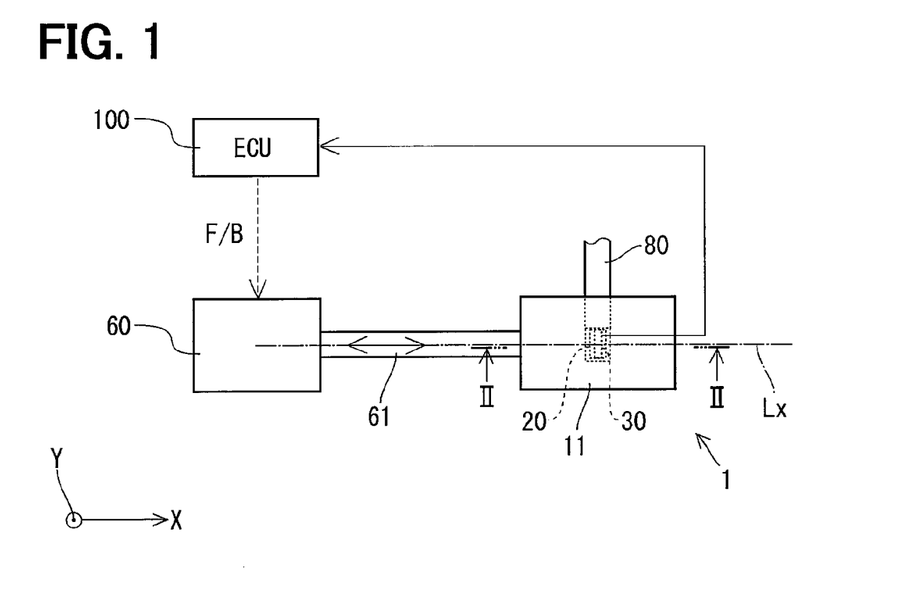
FIG. 1 is a block diagram showing a system to which a stroke amount detection device according to a first embodiment of the present disclosure is applied.

As shown in FIG. 1, the stroke amount detection device 1 includes a yoke 11, a permanent magnet 20, and a magnetism detection IC 30. The magnetism detection IC 30 can operate as a magnetic flux generation section. The yoke 11 is attached to a stroke part 61 of a linear actuator 60. The yoke 11 can reciprocate on a virtual straight line Lx with the stroke part 61. The magnetism detection IC 30 is fixed to a holding part 80 with the permanent magnet 20. The magnetism detection IC 30 detects a magnetic flux density in accordance with a change in a magnetic flux vector. As shown in FIG. 1, a direction of a movement of the stroke part 61 is referred to as an X-direction and a direction perpendicular to a plane of a paper is referred to as a Y-direction. The virtual straight line Lx is a straight line that passes through a middle point of a Hall element 31 in the Y-direction and extends in the X-direction.

Figure 2:
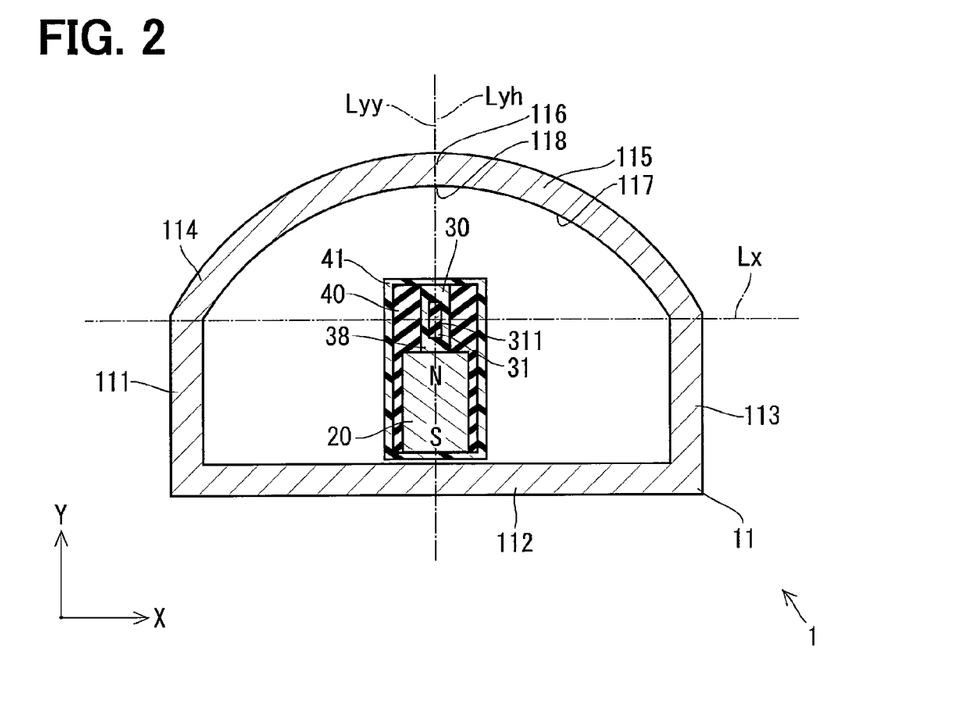
FIG. 2 is a cross-sectional view of the stroke amount detection device taken along line II-II in FIG. 1.

As shown in FIG. 2, the yoke 11 is made from magnetic material, such as iron. The yoke 11 has a pipe shape having a first wall 111, a second wall 112, a third wall 113, and a fourth wall 114. Each of the first wall 111, the second wall 112, and the third wall 113 has a plate shape, and the first wall 111, the second wall 112, and the third wall 113 form a U-shape. End portions of the first wall 111 and the third wall 113 are located on the virtual straight line Lx. The fourth wall 114 is disposed between the first wall 111 and the third wall 113 and faces the second wall 112. The fourth wall 114 has a protruding section 115 protruding to outside the yoke 11 in a direction opposite from the second wall 112. The protruding section 115 has a top portion 116 at a center portion of the fourth wall 114 in the X-direction. The protruding section 115 has a depressed surface 117 on an inner wall facing the second wall 112. Furthermore, the protruding section 115 has a bottom portion 118 on the inner wall facing the second wall 112. The bottom portion 118 is opposite to the top portion 116. In the present embodiment, a change rate of a distance between an outer wall of the protruding section 115 and the virtual straight line Lx becomes zero at the top portion 116. The change rate of the distance between the outer wall of the protruding section 115 and the virtual straight line Lx gradually increases with increase in distance from the top portion 116. Furthermore, a change rate of a distance between the depressed surface 117 and the virtual straight line Lx becomes zero at the bottom portion 118, and the change rate of the distance between the depressed surface 117 and the virtual straight line Lx gradually increases with increase in distance from the bottom portion 118. In other words, the protruding section 115 having the depressed surface 117 is formed into an arc shape.

As shown in FIG. 2, the permanent magnet 20 is located in the yoke 11. The permanent magnet 20 is disposed in such a manner that a direction of a magnetic flux passing through the permanent magnet 20 is parallel to the Y-direction. The permanent magnet has a north pole facing the protruding section 115 and a south pole facing the second wall 112.

Figure 3:
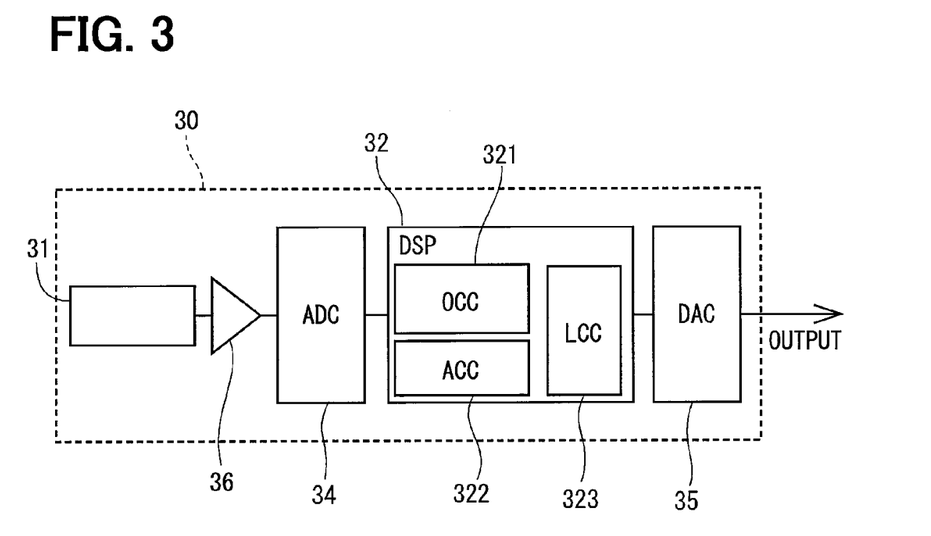
FIG. 3 is a block diagram showing a magnetism detection IC according to the first embodiment.
Figure 4:
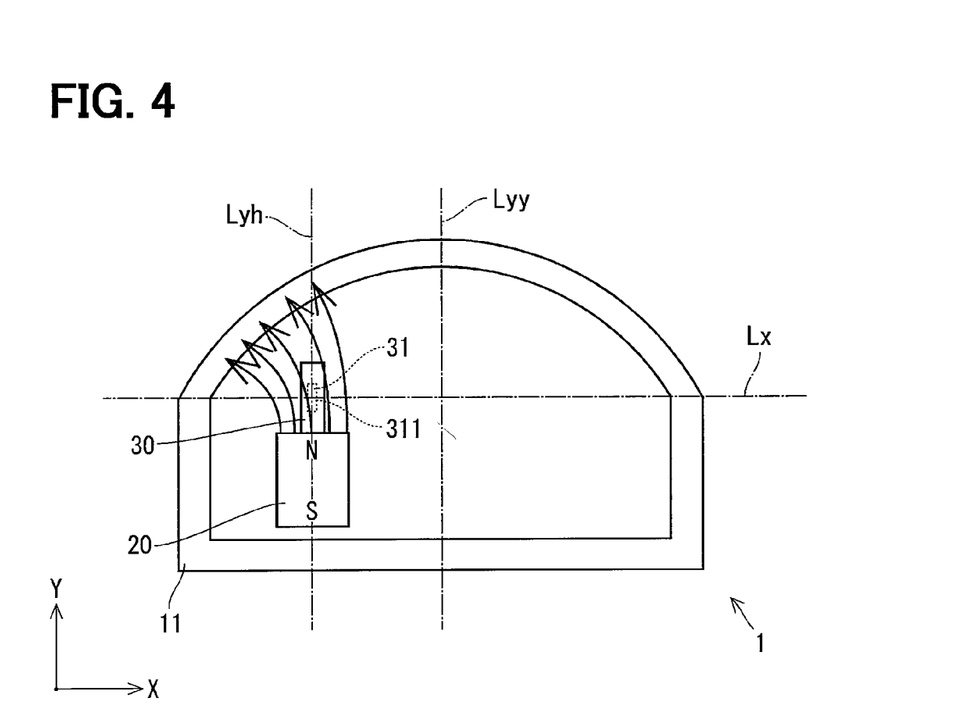
FIG. 4 is a diagram showing operation of the stroke amount detection device according to the first embodiment.
Figure 5:
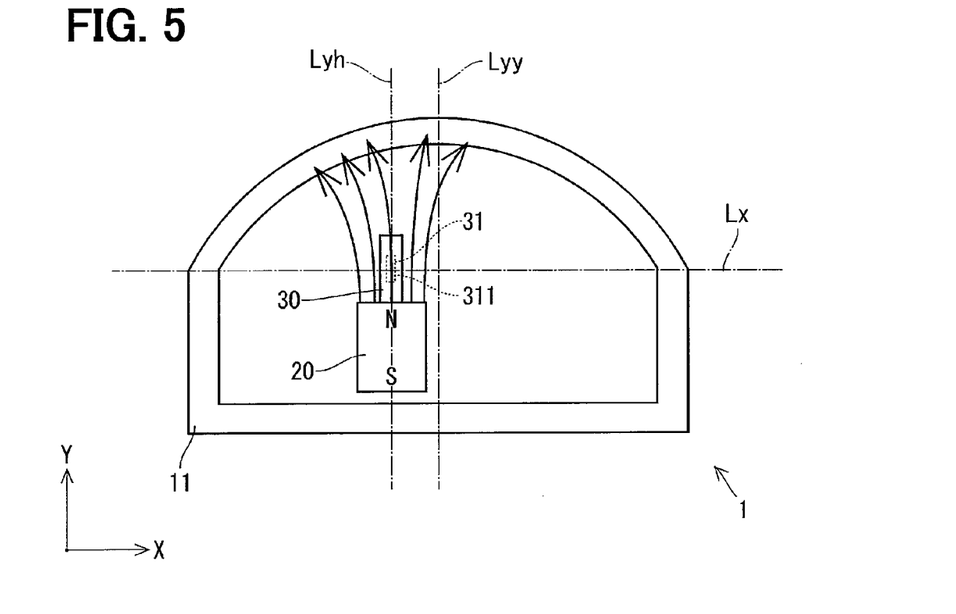
FIG. 5 is a diagram showing operation of the stroke amount detection device according to the first embodiment.
Figure 6:
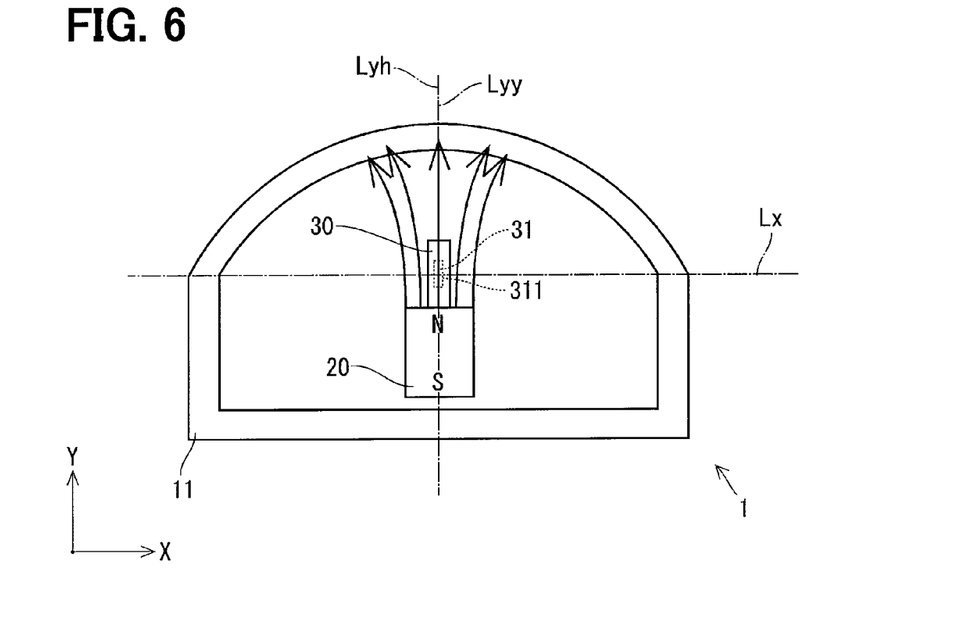
FIG. 6 is a diagram showing operation of the stroke amount detection device according to the first embodiment.
Figure 7:
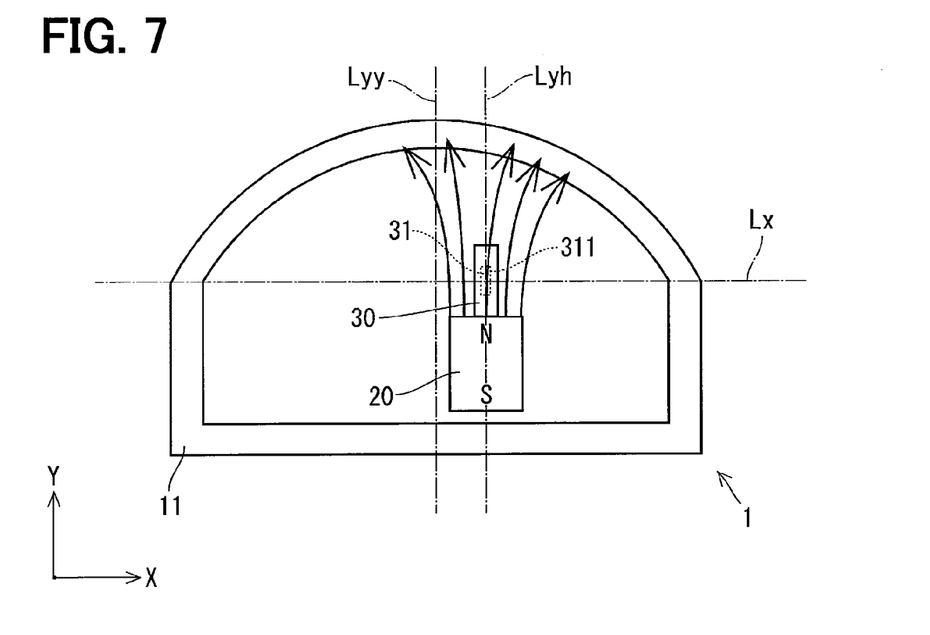
FIG. 7 is a diagram showing operation of the stroke amount detection device according to the first embodiment.
Figure 8:
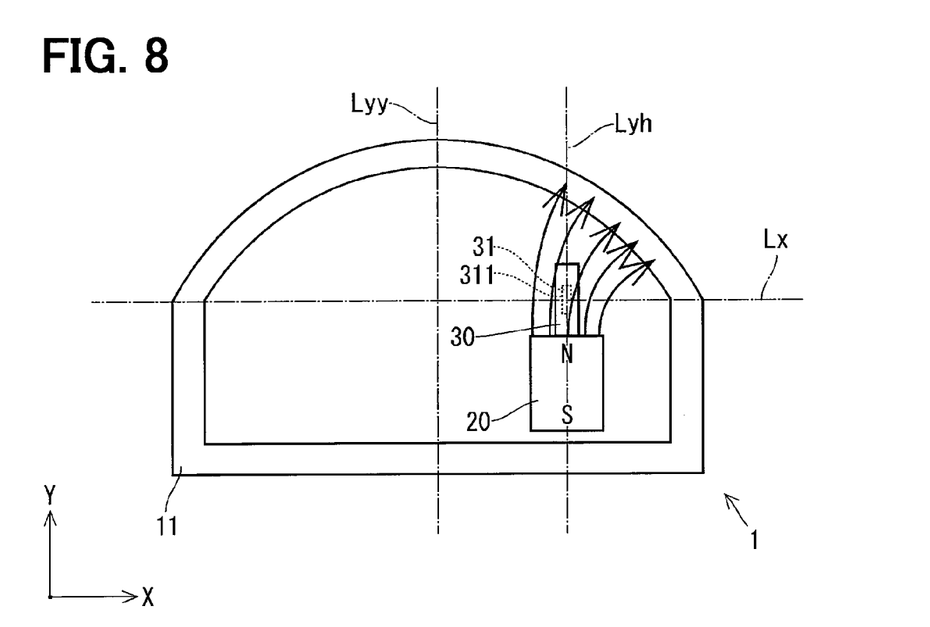
FIG. 8 is a diagram showing operation of the stroke amount detection device according to the first embodiment.

The magnetism detection IC 30 is disposed between the north pole of the permanent magnet 20 and the protruding section 115. The magnetism detection IC 30 includes the Hall element 31, a signal processing device 32, and a memory 33. The Hall element 31 can operate as a magnetism detection section.

The Hall element 31 is made of a semiconductor thin layer and has a magnetism sensing surface 311 (see FIG. 2). The Hall element 31 outputs a signal in accordance with a magnetic flux associated with a change in magnetic flux vector passing through the magnetism sensing surface 311. The magnetism detection IC 30 is disposed in such a manner that the magnetism sensing surface 311 is perpendicular to the X-direction. A direction perpendicular to the magnetism sensing surface 311 corresponds to a magnetism sensing direction.

The signal processing device 32 includes, for example, a digital signal processor (DSP). The signal processing device 32 includes an offset correction circuit 321, an amplitude correction circuit 322, and a linear correction circuit 323. The linear correction circuit 323 linearizes an output signal of the magnetism detection IC 30 with respect to the stroke amount. The linear correction circuit 323 can operate as a linear correction section. The memory 33 includes, for example, a read-only memory and a writable and erasable memory. The memory 33 stores various data used by the signal processing device 32.

The magnetism detection IC 30 includes an amplifier circuit 36, an analog-to-digital conversion circuit (ADC) 34, and a digital-to-analog conversion circuit (DAC) 35 sealed with a mold part 38 in addition to the Hall element 31, the signal processing device 32, and the memory 33 as shown in FIG. 2.

The permanent magnet 20 and the magnetism detection IC 30 are fixed to the holding part 80 so as to be located in the yoke 11. Thus, the magnetism detection IC 30 is disposed at a fixed position with respect to the permanent magnet 20. In the present embodiment, the permanent magnet 20 and the magnetism detection IC 30 are sealed with a buffer 40 in a sensor cover 41 so as to be integrally fixed. In the present application, "integrally fixed" means that the permanent magnet 20 and the magnetism detection IC 30 are not movable with respect to each other. The permanent magnet 20 and the magnetism detection IC 30 may be in contact with other. Alternatively, the permanent magnet 20 and the magnetism detection IC 30 may be separated from each other by a predetermined distance. In the present embodiment, the permanent magnet 20 and the magnetism detection IC 30 are in contact with each other, and the Hall element 31 is in contact with the permanent magnet 20 through the mold part 38. The buffer 40 is made of, for example, silicon rubber.

The yoke 11 moves in the X-direction with respect to the magnetism detection IC 30 and the permanent magnet 20 in associated with a linear movement of the stroke part 61. The relative movement of the magnetism detection IC 30 and the permanent magnet 20 with respect to the yoke 11 will be described with reference to FIG. 4 to FIG. 8. In the Y-direction, a line passing through a center of the Hall element 31 in the Y-direction is referred to as a reference line Lyh of the Hall element 31 and a line passing through the top portion 116 of the protruding section 115 and a center of the second wall 112 in the X-direction is referred to as a reference line Lyy of the yoke 11.

A magnetic flux density passing through the magnetism sensing surface 311 of the Hall element 31 changes in associated with a relative stroke of the yoke 11 with respect to the Hall element 31 and the permanent magnet 20. The Hall element 31 outputs a signal in accordance with the magnetic flux density passing through the magnetism sensing surface 311. The ADC 34 converts an analog value output from the Hall element 31 to a digital value and transmits the digital value to the signal processing device 32. Hereafter, the digital value converted by the ADC 34 is referred to as an "actual output value". The signal processing device 32 performs a correction process, such as a linear correction, to the actual output value. Furthermore, the signal processing device 32 transmits a processed result to the DAC 35. Hereafter, the value after the correction process transmitted to the DAC 35 is referred to as a "corrected value". The DAC 35 converts the digital value transmitted from the signal processing device 32 to an analog value and transmits the analog value to an electronic control unit (ECU) 50.

Figure 9:
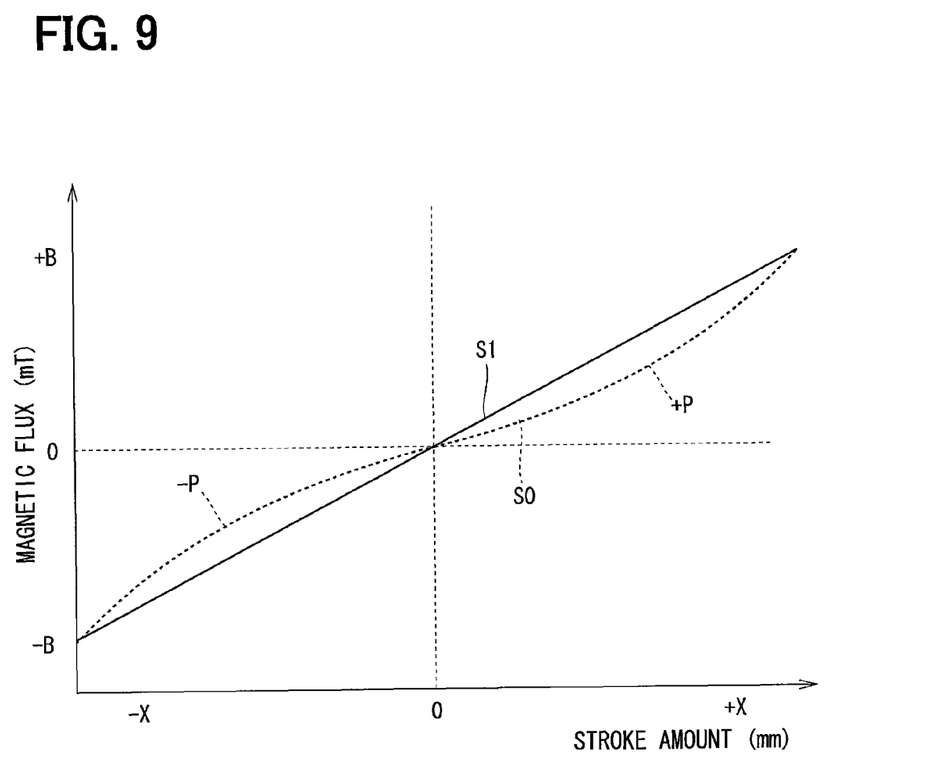
FIG. 9 is a diagram showing a magnetic flux density detected by a Hall element according to the first embodiment.

FIG. 9 is a diagram showing a relationship of a stroke amount of the stroke part 61 corresponding to FIG. 4 to FIG. 8 and the actual output value. When the yoke 11 moves in the X-direction with respect to the magnetism detection IC 30 and the permanent magnet 20 in associated with the linear movement of the stroke part 61, the actual output value changes as shown by the dashed line S0 in FIG. 9. In the present embodiment, when the reference line Lyh of the Hall element 31 overlaps the reference line Lyy, the actual output value becomes zero, and the stroke amount of the stroke part 61 becomes zero. The stroke amount in a case where the reference line Lyh of the Hall element 31 is located to the left of the reference line Lyy of the yoke 11 is expressed by a negative value, and the stroke amount in a case where the reference line Lyh of the Hall element 31 is located to the right of the reference line Lyy of the yoke 11 is expressed by a positive value. A linearity of the detected magnetic flux is reduced at a "+P part" and a "−P part", which are both side parts of a stroke range. The linear correction circuit 323 linearizes the actual output value and outputs the corrected value shown by the solid line S1.

The detected stroke amount is transmitted to the ECU 50. The ECU 50 performs a feedback control of a linear actuator 60 based on the stroke amount transmitted from the stroke amount detection device 1.

As described above, in the present embodiment, the Hall element 31 is located between the permanent magnet 20 and the protruding section 115 of the yoke 11 and the Hall element 31 is fixed with respect to the permanent magnet 20. The magnetism detection IC 30 is disposed in such a manner that the direction perpendicular to the sensing surface 311 of the Hall element 31 is perpendicular to the direction of the magnetic flux passing through the permanent magnet 20. In other words, the magnetism detection IC 30 is disposed in such a manner that a magnetism sensing direction of the Hall element 31 is perpendicular to the direction of the magnetic flux passing through the permanent magnet 20. When the yoke 11 moves with respect to the magnetism detection IC 30 and the permanent magnet 20, a gap between the protruding section 115 and the magnetism detection IC 30 changes, and the magnetic flux vector detected by the magnetism detection IC 30 changes. Accordingly, the relative position of the yoke 11 with respect to the magnetism detection IC 30 can be detected.

In the present embodiment, the position of the stroke part 61 is detected using only one permanent magnet 20. Thus, compared with the conventional stroke amount detection device, for example, described in the Patent Document No. 1, the number of components can be reduced. Furthermore, because it is not necessary to join the permanent magnet 20 to the yoke 11, a joint process of the permanent magnet 20 and the yoke 11 can be omitted. Thus, the number of processes can be reduced.

In the present embodiment, the top portion 116 of the protruding section 115 is formed at the center portion of the fourth wall 114 of the yoke 11 in the X-direction. Accordingly, when the referent line Lyh of the Hall element 31 overlaps the reference line Lyy of the yoke 11, that is, when the Hall element 31 is located at the center portion of the yoke 11 in the X-direction, the magnetic flux density becomes zero. When the magnetic flux density is zero, theoretically there is no temperature characteristic. Thus, a detection accuracy becomes the highest. Thus, a position where a high detection accuracy is required can be set to the center portion of the stroke range.

In the present embodiment, the protruding section 115 is line symmetrical on both sides of the reference line Lyy of the yoke 11 passing through the top portion 116. In addition, the protruding section 115 and the depressed surface 117 have arc shapes. Thus, the gap between the protruding section 115 and the magnetism detection IC 30 decreases with increase in distance between the magnetism detection IC 30 and the top portion 116. Accordingly, the actual output value changes in the same manner on both sides of the position where the reference line Lyh of the Hall element 31 overlaps the reference line Lyy of the yoke 11.

In the present embodiment, the stroke amount detection device 1 includes the linear correction circuit 323 that performs the linear correction to the actual output value. Accordingly, the linearity of the corrected value can be improved.

Second Embodiment

Figure 10:
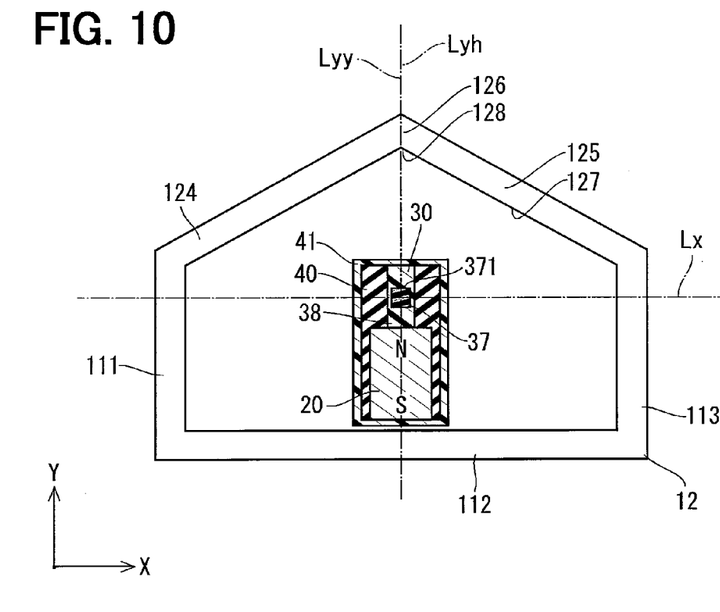
FIG. 10 is a diagram showing a stroke amount detection device according to a second embodiment of the present disclosure.

The stroke amount detection device according to a second embodiment of the present disclosure will be described with reference to FIG. 10. Components substantially similar to the components of the first embodiment are designated by the same reference numerals and the description about the components will be omitted. In the present embodiment, a fourth wall 124 of a yoke 12 includes a protruding section 125. The protruding section 125 protrudes to outside the fourth wall 124 and has a top portion 126. The protruding section 125 has a depressed surface 127 on an inner wall facing the second wall 112, and the depressed surface 127 has a bottom portion 128 at a position opposite to the top portion 126. In the present embodiment, the protruding section 125 has such a shape that a change rate of a distance from the virtual straight line Lx constantly decreases with increase in distance from the top portion 126 of the protruding section 125. The depressed surface 127 of the protruding section 125 has such a shape that a change rate of a distance from the virtual straight line Lx constantly decreases with increase in distance from the bottom portion 128. In other words, the protruding section 125 including the depressed surface 127 is formed into an angular shape.

In the present embodiment, a magnetism resistive element 37 is disposed in the magnetism detection IC 30. The magnetism resistive element 37 can operate as a magnetism detection section. A magnetism sensing direction of the magnetism resistive element 37 is perpendicular to a magnetism sensing surface 371. In the present embodiment, the magnetism resistive element 37 is disposed in such a manner that the magnetism sensing direction is parallel to direction of the magnetic flux passing through the permanent magnet 20. The magnetism resistive element 37 outputs a signal in accordance with a magnetic flux vector passing through the magnetism sensing surface 371. The virtual straight line Lx is a straight line extending in the X-direction and passing through a middle point of the magnetism resistive element 37 in the Y-direction. The stroke amount detection device according to the present embodiment has effects similar to the effects of the first embodiment.

Third Embodiment

Figure 11:
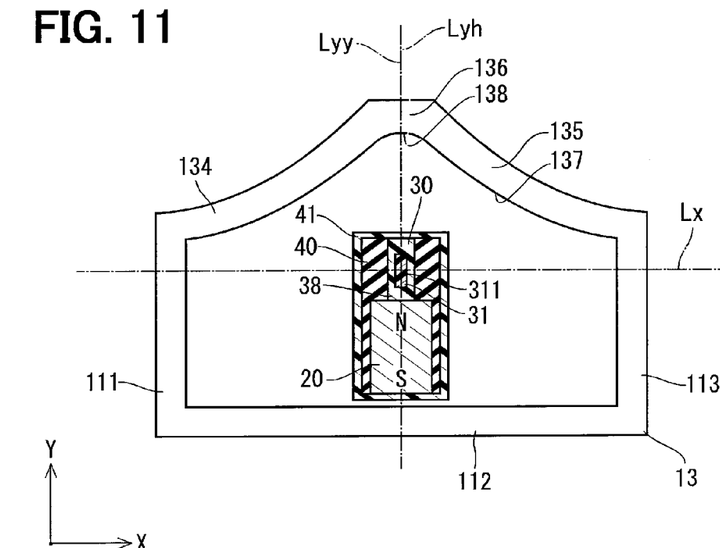
FIG. 11 is a diagram showing a stroke amount detection device according to a third embodiment of the present disclosure.

A stroke amount detection device according to a third embodiment of the present disclosure will be described with reference to FIG. 11. Components substantially similar to the components of the first embodiment are designated by the same reference numerals and the description about the components will be omitted. In the present embodiment, a fourth wall 134 of a yoke 13 includes a protruding section 135. The protruding section 135 protrudes to outside the fourth wall 134 and has a top portion 136. The protruding section 135 has a depressed surface 137 on an inner wall facing the second wall 112, and the depressed surface 137 has a bottom portion 138 at a position opposite to the top portion 136. In the present embodiment, the protruding section 135 has such a shape that a change rate of a distance from the virtual straight line Lx gradually decreases with increase in distance from the top portion 136 of the protruding section 135. The depressed surface 137 has such a shape that a change rate of a distance from the virtual straight line Lx gradually decreases with increase in the distance from the bottom portion 138. In other wards, the protruding portion 135 of the yoke 13 including the depressed surface 137 is formed into a skirt shape. The stroke amount detection device according to the present embodiment has effects similar to the effects of the first embodiment.

Fourth Embodiment

Figure 12:
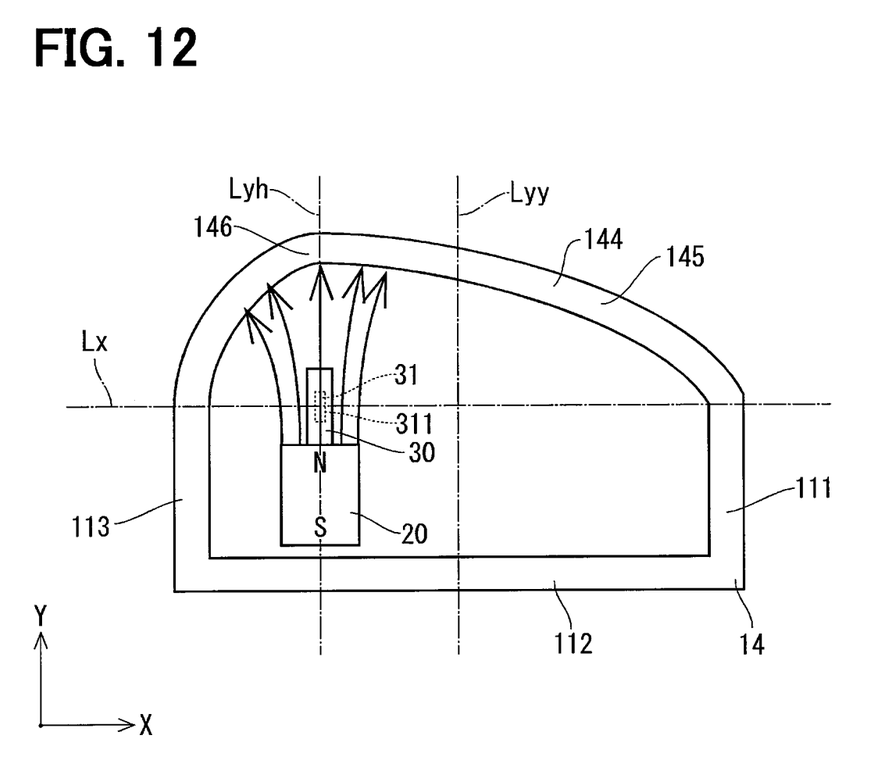
FIG. 12 is a diagram showing a stroke amount detection device according to a fourth embodiment of the present disclosure.
Figure 13:
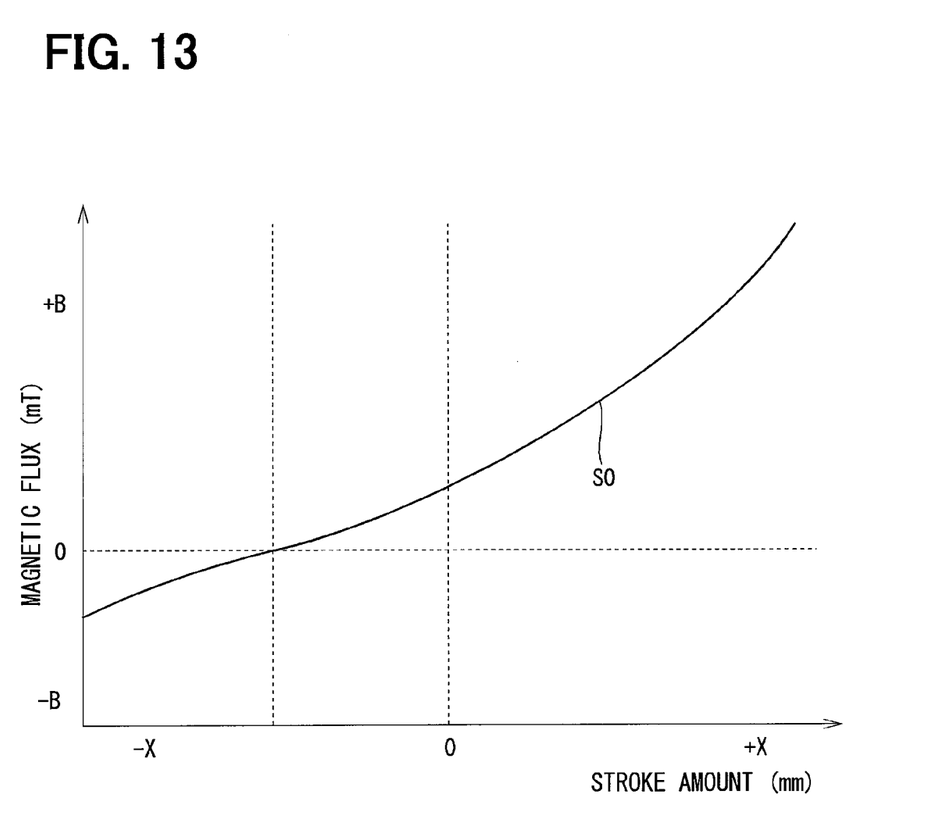
FIG. 13 is a diagram showing a magnetic flux density detected by a Hall element according to the fourth embodiment.

A stroke amount detecting device according to a fourth embodiment of the present disclosure will be described with reference to FIG. 12 to FIG. 15. Components substantially similar to the components of the first embodiment are designated by the same reference numerals and the description about the components will be omitted. In the present embodiment, a fourth wall 144 of a yoke 14 includes a protruding section 145 having an arc shape. The protruding section 145 is asymmetrical on both sides of a top portion 146 in the X-direction. As shown in FIG. 12, the top portion 146 is located at a position closer to the stroke part 61 with respect to the reference line Lyy.

Figure 14:
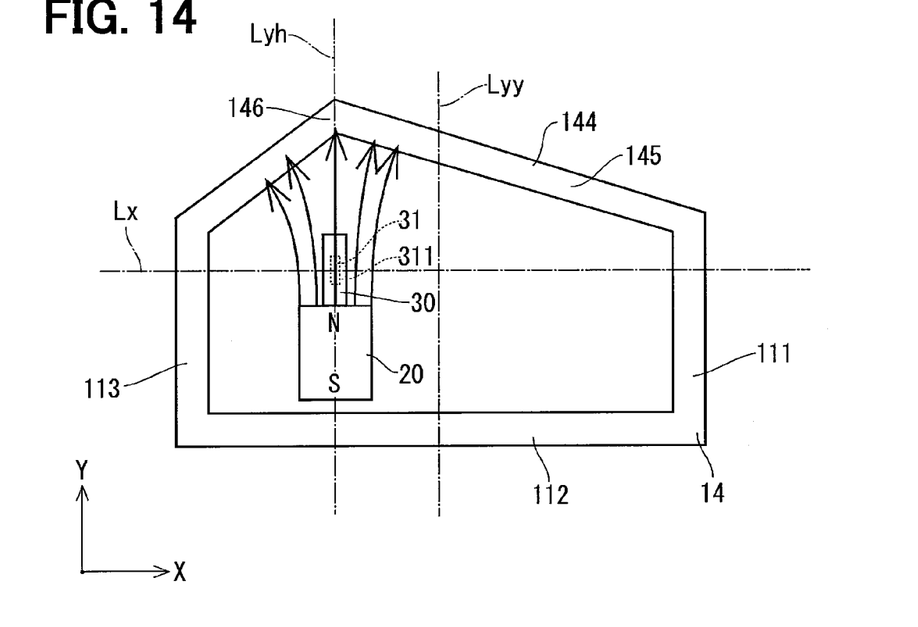
FIG. 14 is a diagram showing a stroke amount detection device according to a modification of the fourth embodiment.
Figure 15:
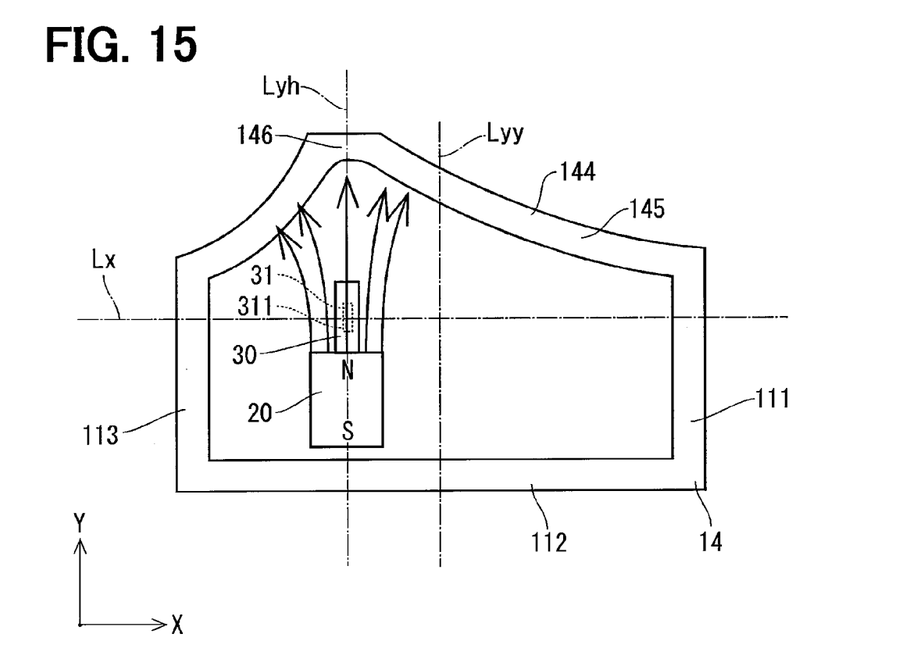
FIG. 15 is a diagram showing a stroke amount detection device according to another modification of the fourth embodiment.

Accordingly, in the stroke range, the magnetic flux density becomes zero at a position where the stroke amount is expressed by a negative value. Thus, a temperature characteristic can be reduced, and the detection accuracy can be increased (see FIG. 13). Thus, a region where the detection accuracy is high can be selectively used centering on a point where the magnetic flux density becomes zero. Stroke amount detection devices according to modifications of the present embodiment are shown in FIG. 14 and FIG. 15. In the stroke amount detection device shown in FIG. 14, the protruding section 145 has an angular shape and the top portion 146 is located at a position closer to the stroke part 61 with respect to the reference line Lyy. In the stroke amount detection device shown in FIG. 15, the protruding section 145 has a skirt shape and the top portion 146 is located at a position closer to the stroke part 61 with respect to the reference line Lyy. The stroke amount detection devices according to the modifications have effects similar to the effects of the stroke amount detection device according to the present embodiment.

Fifth Embodiment

Figure 16:
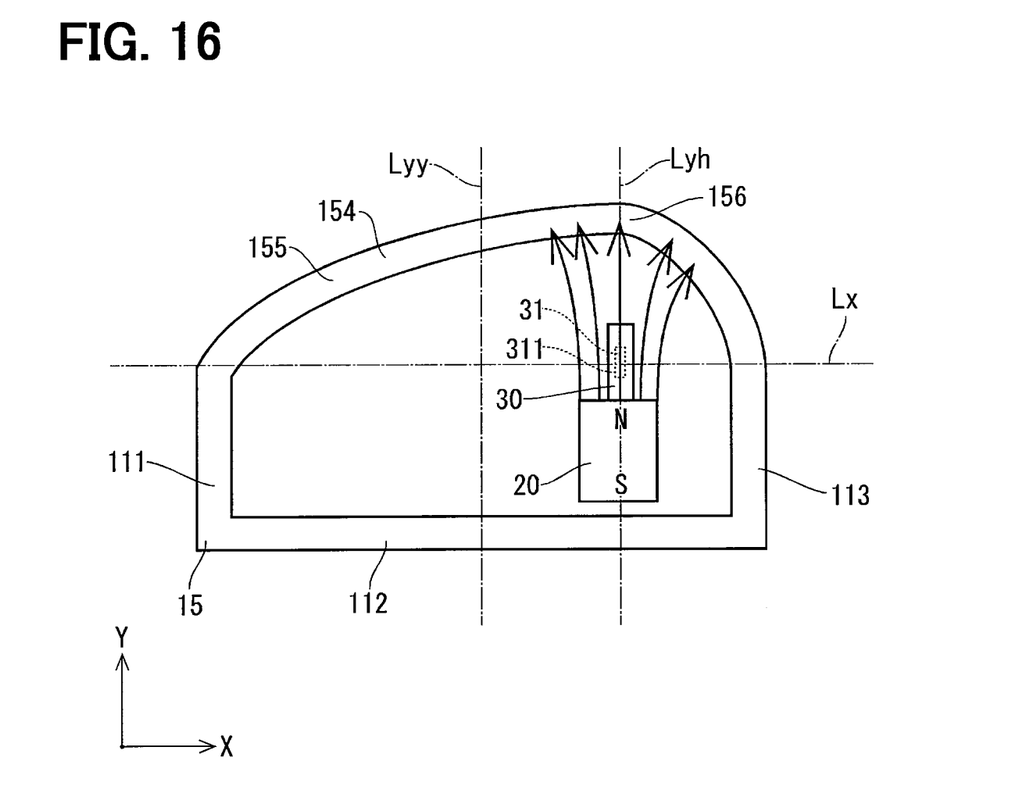
FIG. 16 is a diagram showing a stroke amount detection device according to a fifth embodiment of the present disclosure.
Figure 17:
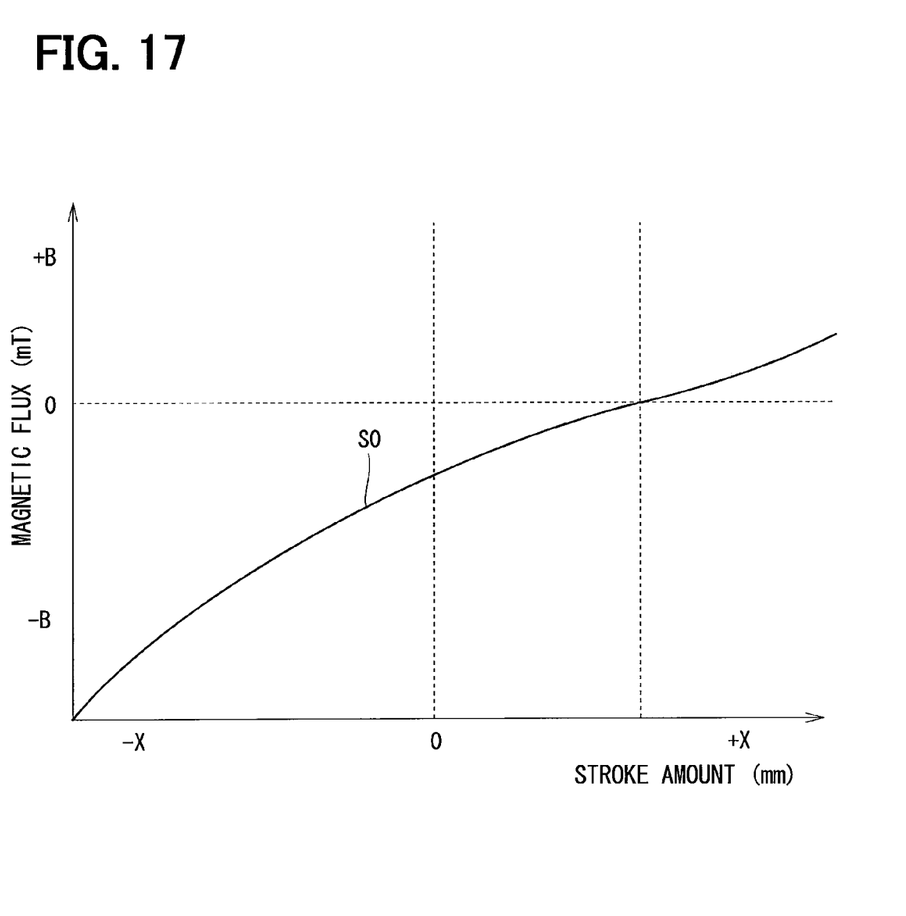
FIG. 17 is a diagram showing a magnetic flux density detected by a Hall element according to the fifth embodiment.

A stroke amount detection device according to a fifth embodiment of the present disclosure will be described with reference to FIG. 16 to FIG. 19. Components substantially similar to the components of the first embodiment are designated by the same reference numerals and the description about the components will be omitted. In the present embodiment, a fourth wall 154 of a yoke 15 includes a protruding section 155 having an arc shape. The protruding section 155 is asymmetrical on both sides of a top portion 156 in the X-direction. As shown in FIG. 16, the top portion 156 is located to an opposite side of the reference line Lyy of the yoke 15 from the stroke part 61.

Figure 18:
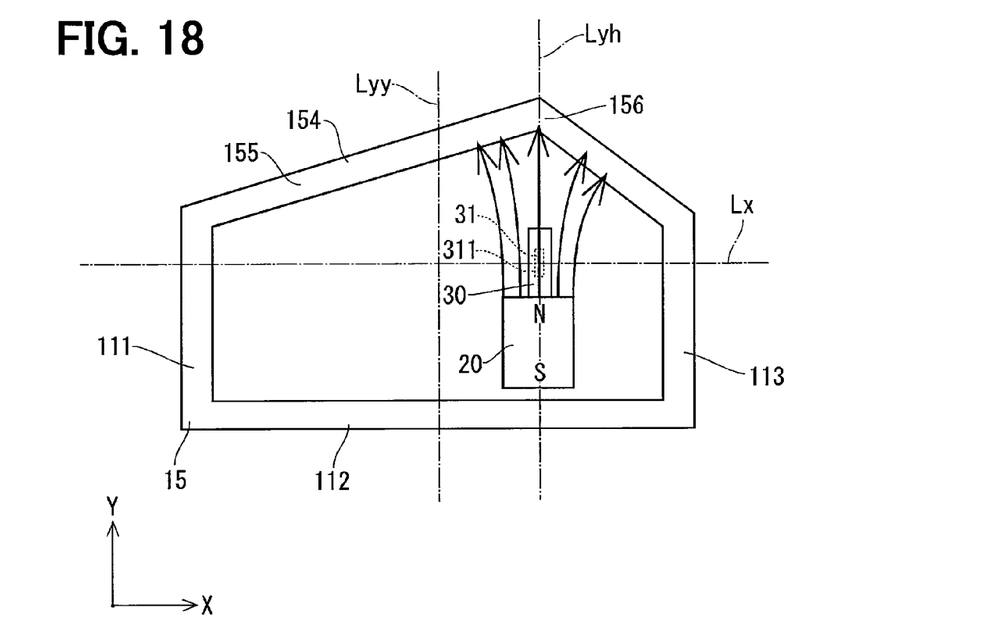
FIG. 18 is a diagram showing a stroke amount detection device according to a modification of the fifth embodiment.
Figure 19:
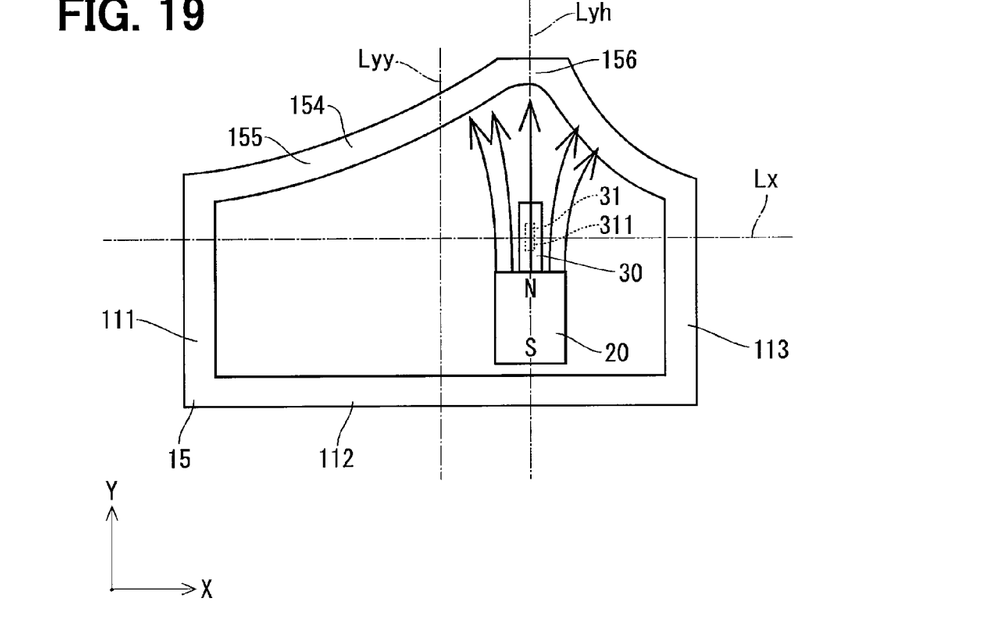
FIG. 19 is a diagram showing a stroke amount detection device according to another modification of the fifth embodiment.

Accordingly, in the stroke range, a position where a high detection accuracy is required can be set in a region where the stroke amount is expressed by a positive value. Thus, a region where the detection accuracy is high can be selectively used centering on a point where the magnetic flux density becomes zero. Stroke amount detection devices according to modifications of the present embodiment are shown in FIG. 18 and FIG. 19. In the stroke amount detection device shown in FIG. 18, the protruding section 155 has an angular shape and the top portion 156 is located on the opposite side of the reference line Lyy from the stroke part 61. In the stroke amount detection device shown in FIG. 19, the protruding section 155 has a skirt shape and the top portion 156 is located on an opposite side of the reference line Lyy from the stroke part 61. The stroke amount detection devices according to the modifications have effects similar to the effects of the stroke amount detection device according to the present embodiment.

Other Embodiments

In the above-described embodiments, the fourth wall has the arc shape, the angular shape, or the skirt shape. In another embodiment, only an inner wall of the fourth wall may be formed into an arc shape, an angular shape, or a skirt shape.

Figure 20:
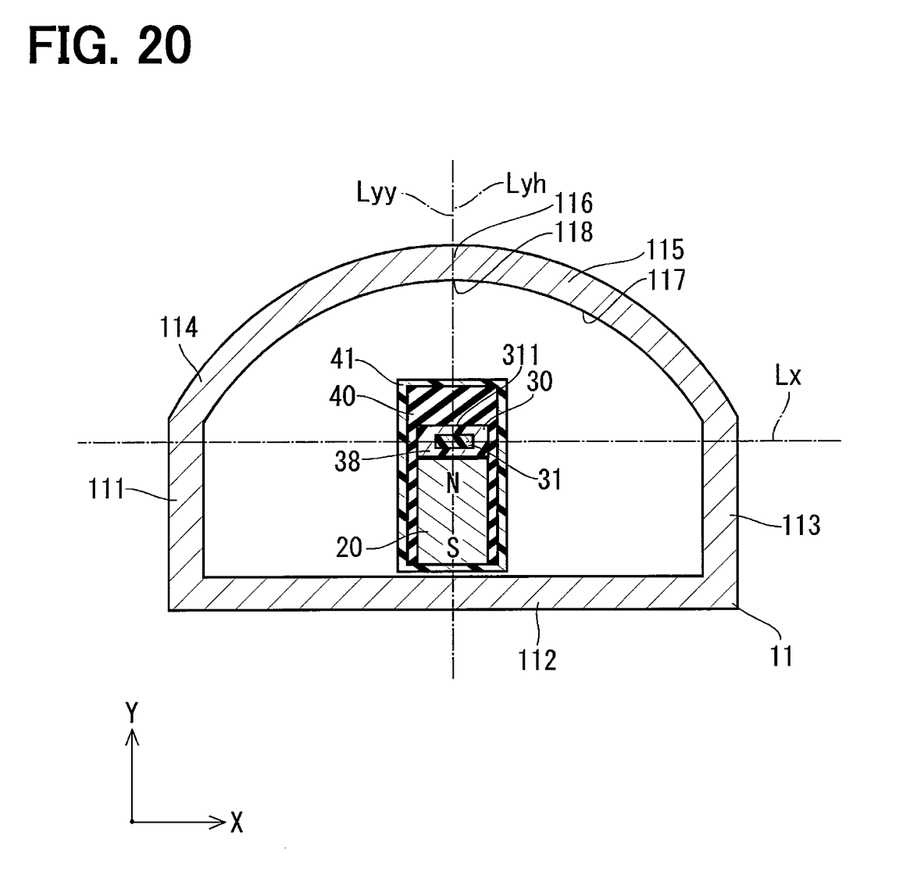
FIG. 20 is a diagram showing a stroke amount detection device according to another embodiment of the present disclosure.

In the first, third, fourth, and fifth embodiments, the magnetism detection IC is disposed in such a manner that the magnetism sensing direction of the Hall element is perpendicular to the direction of the magnetic flux passing through the permanent magnet. In another embodiment, as shown in FIG. 20, the magnetism detection IC may be disposed in such a manner that the magnetism sensing direction of the Hall element is parallel to the direction of the magnetic flux passing through the permanent magnet. In the present case, a stroke detection range is limited to a single side range in which the magnetism detection IC moves from the top portion of the protruding section to a negative side or a positive side in the X-direction.

In the above-described embodiments, the magnetism detection IC and the permanent magnet are in contact with each other. In another embodiment, the magnetism detection IC and the permanent magnet may be separated from each other by a predetermined distance. In the present case, the Hall element and the permanent magnet may be in contact with each other through the mold part and the buffer.

In the above-described embodiments, the end portions of the first wall and the third wall of the yoke are located on the virtual straight line. In another embodiment, the end portions of the first wall and the third wall may be located on a lower side or an upper side of the virtual straight line in accordance with a desired output characteristic.

In the above-described embodiments, the north pole of the permanent magnet faces the protruding section, and the south pole of the permanent magnet faces the second wall. In another embodiment, the permanent magnet may be disposed in such a manner that the north pole faces the second wall and the south pole faces the protruding section.

In the second embodiment, the magnetism resistive element is disposed in such a manner that the magnetism sensing direction of the magnetism resistive element is parallel to the direction of the magnetic flux passing through the permanent magnet. In another embodiment, the magnetism resistive element may be disposed in such a manner that the magnetism sensing direction of the magnetism resistive element is perpendicular to the direction of the magnetic flux passing through the permanent magnet. Also in the present case, the stroke detection range is limited to a single side range in which the magnetism detection IC moves from the top portion of the protruding section to a negative side or a positive side in the X-direction.

In the above-described embodiments, the yoke is attached to the stroke part, and the magnetism detection IC and the permanent magnet are attached to the holding part. Alternatively, the yoke may be attached to the holding part, and the magnetism detection IC and the permanent magnet may be attached to the stroke part.

While the present disclosure has been described with reference to the foregoing embodiments, it is to be understood that the disclosure is not limited to the embodiments and constructions. The present disclosure is intended to cover various modification and equivalent arrangements.

What is claimed is:

1. A stroke amount detection device for detecting a position of a detection object that moves on a virtual straight line with respect to a holding part, comprising:
    a yoke attached to one of the detection object and the holding part, the yoke formed into a pipe shape from magnetic material, the yoke having a protruding device that protrudes to outside the yoke in a direction perpendicular to the virtual straight line, the protruding device having a top portion at which a distance from the virtual straight line in the direction perpendicular to the virtual straight line is maximum;
    a magnetic flux generation device attached to the other one of the detection object and the holding part, and located in the yoke; and
    a magnetism detection device disposed between the magnetic flux generation device and the protruding device, the magnetism detection device disposed at a fixed position with respect to the magnetic flux generation device, the magnetism detection device having a magnetism sensing direction in a direction perpendicular to a direction of a magnetic flux passing through the magnetic flux generation device, the magnetism detection device outputting a signal in accordance with a magnetic flux density generated due to a relative movement of the yoke with respect to the magnetism detection device.

2. The stroke amount detection device according to claim 1,
    wherein the top portion is located at a center portion of the yoke in a direction of the relative movement.

3. The stroke amount detection device according to claim 2,
    wherein the protruding device is line symmetrical on both sides of the top portion in a direction in which the virtual straight line extends.

4. The stroke amount detection device according to claim 1,
    wherein the top portion is located at a portion of the yoke other than a center portion in a direction in which the virtual straight line extends.

5. The stroke amount detection device according to claim 1,
    wherein the protruding device has such a shape that a change rate of the distance from the virtual straight line is zero at a position opposite to the top portion, and the change rate gradually increases with increase in distance from the top portion.

6. The stroke amount detection device according to claim 1,
    wherein the protruding device has such a shape that a change rate of the distance from the virtual straight line is zero at a position opposite to the top portion, and the change rate constantly decreases with increase in distance from the top portion.

7. The stroke amount detection device according to claim 1,
    wherein the protruding device has such a shape that a change rate of the distance from the virtual straight line is zero at a position opposite to the top portion, and the change rate gradually decreases with increase in distance from the top portion.

8. The stroke amount detection device according to claim 1,
    wherein the magnetism detection device includes a Hall element.

9. The stroke amount detection device according to claim 1,
    wherein the magnetism detection device includes a magnetism resistive element.

10. The stroke amount detection device according to claim 1, further comprising
    a linear correction device performing a correction to improve a linearity of the signal output from the magnetism detection device.

* * * * *